United States Patent [19]

Reiterman

[11] Patent Number: 4,948,305

[45] Date of Patent: Aug. 14, 1990

[54] BORING BAR

[75] Inventor: Lee Reiterman, Royal Oak, Mich.

[73] Assignee: GTE Valenite Corporation, Troy, Mich.

[21] Appl. No.: 289,078

[22] Filed: Dec. 23, 1988

[51] Int. Cl.⁵ .............................................. B26D 1/00
[52] U.S. Cl. ..................................... 408/224; 407/58; 407/61
[58] Field of Search ............... 408/218, 223, 224, 230, 408/231; 407/33, 34, 42, 41, 53, 55, 56, 57, 58, 59, 60, 61, 63

[56] References Cited

U.S. PATENT DOCUMENTS

| | | | |
|---|---|---|---|
| 1,418,485 | 6/1922 | Smith | 407/61 |
| 1,610,087 | 12/1926 | Hanson | 408/217 |
| 2,048,058 | 7/1936 | Comeau | 407/61 |
| 2,396,289 | 3/1946 | Ross | 407/57 |
| 4,074,594 | 2/1978 | Dall | 407/61 |
| 4,765,782 | 8/1988 | Ohkita | 407/61 |
| 4,844,666 | 7/1989 | Tsumjimura | 407/62 |

FOREIGN PATENT DOCUMENTS 218856  4/1987  European Pat. Off. .............. 407/53

Primary Examiner—Frederick R. Schmidt
Assistant Examiner—Blynn Shideler
Attorney, Agent, or Firm—David J. Koris

[57] ABSTRACT

Boring bar having plural circumferentially spaced cutting inserts with incremental radial and axial spacing for innermost radial and foremost axial to outermost radial and rearmost axial in progressive sequence relative to the direction of rotation.

4 Claims, 1 Drawing Sheet

BORING BAR

BACKGROUND OF THE INVENTION

In order to decrease cutting time and thereby increase production, industry, under present state of the art, is using materials such as Silicon Nitride and Cubic Boron Nitride that will permit boring of cast iron at rates in excess of 3,000 feet per minute. Problems presented by this are: (1) the materials (SiNi and CBN) are expensive and the high machining rates also require high spindle speeds, frequently in excess of 4,000 R.P.M. This can cause premature spindle bearing wear.

Face milling tools are known in the art with incremental cutting insert positions such as the FACE MILLING CUTTER disclosed in U.S. Pat. No. 4,586,855 wherein it is an important feature that the axial steps between successive inserts be very small, preferably less than about 0.01" with steps in the range of 0.002 to 0.005" being preferred with cast iron or steel workpieces. In a typical face mill illustrated in such patent, ten equally spaced inserts were axially stepped by a distance of 0.002 and radially stepped by an amount of 0.090". Each chip removed at a thickness of 0.002" and length of 0.640" and radial step in on the part of 0.026". The total depth of cut between the workpiece finished face and the top surface of the material to be removed was 0.020".

BRIEF DESCRIPTION OF THE PRESENT INVENTION

The present invention is intended to run at normal (for use with carbide inserts) machining rates (300 to 400 S.F.M.) and spindle speeds (200 to 500 R.P.M. depending on cutting diameter). In order to decrease cutting time, the penetration or feed rate is increased. The stepped geometries allow this elevated feed rate.

In the boring bar of the present application, the cutting action location of multiple inserts and form of chip removed is completely different from that of face mills. The axial lead insert is at the radially innermost position as compared to the outermost in the reference face mill; the axial step in insert mounting is relatively large, e.g., 0.040" versus 0.002" in the case of the reference face mill; a relatively small radial step, e.g., in the order of 0.004" is provided from insert to insert as compared to 0.090" in said face milling cutter. By providing eight inserts equally spaced circumferentially and progressively stepped axially and radially as indicated above, a boring bar of the configuration illustrated in the drawings permits feed rates in the range of 0.200 to 0.320" per revolution, for example in high volume rough boring of engine cylinder blocks enlargement the order of 0.048 to 0.080" diameter.

DETAILED DESCRIPTION OF THE ILLUSTRATED PREFERRED EMBODIMENT

Figure 1:
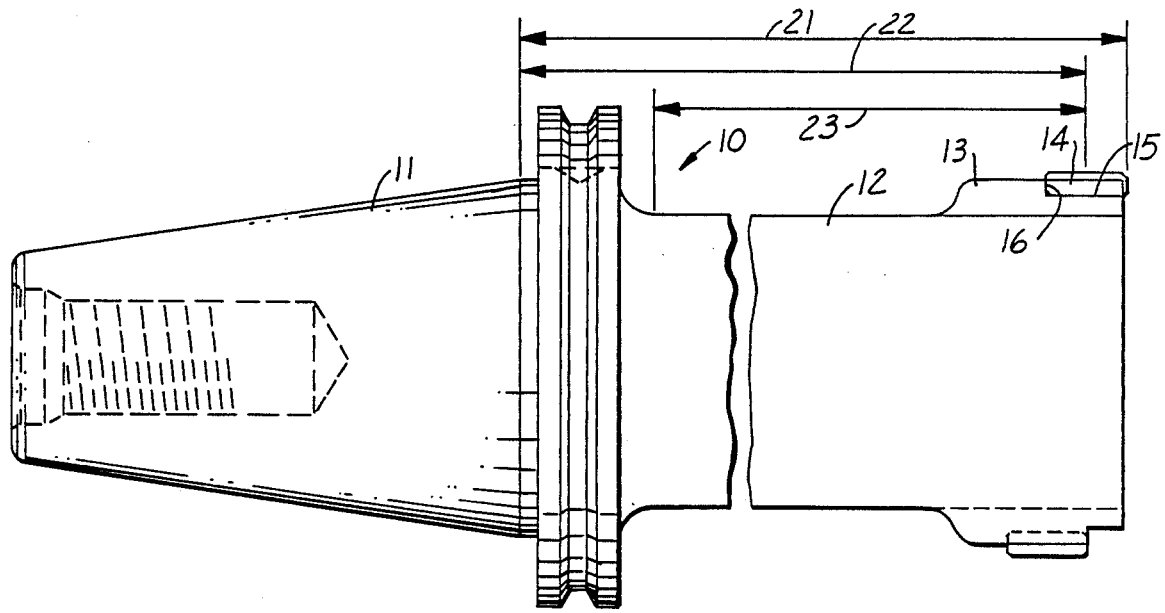
FIG. 1 a side elevation of a shortened special rough bore cylinder bar constructed in accordance with the present invention.
Figure 2:
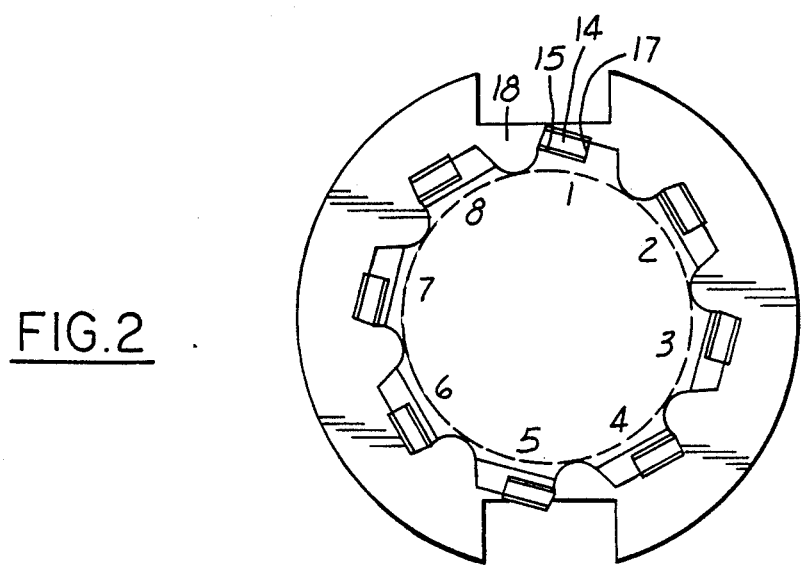
FIG. 2 is an end view of the boring bar.

Boring bar 10 is equipped with tapered shank 11 and body 12 of appropriate length for boring cylinder blocks but foreshortened in the drawings to conserve space. Each of eight radially projecting, axially elongated insert seats 13 for eight rectangular laydown inserts 14 is provided with radially locating bottom seat 15, axial locating end wall 16 and circumferential locating side wall 17. Each insert is positioned with negative radial rake and zero axial rake with two index positions on each side being retained in its pocket by a central screw, not illustrated.

Figure 3:
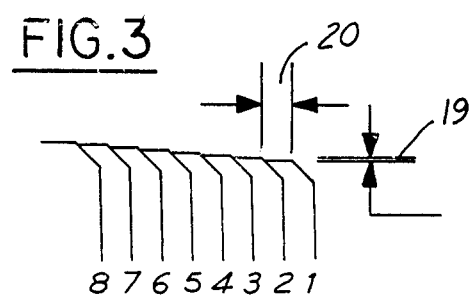
FIG. 3 is a schematic illustration of the relative axial and radial progression of eight individual inserts shown in the boring bar of FIGS. 1 and 2.

A chip clearance gullet 18 is provided adjacent the cutting edge of each insert to accommodate axial flow to the space surrounding the smaller diameter body 12. Progressive radially outward and axial backward positions for the respective eight inserts are schematically illustrated in FIG. 3. Lead insert 1 is positioned at the axial foremost and radial innermost location with each of successive inserts 2-8 being positioned at relatively small radial increments 19, in the order of 0.003" to 0.005", and relatively large axial increments 20, in the order of 0.025" to 0.040", to provide a total rough boring enlargement of 0.048" to 0.080" dia. with a potential axial feed rate equal to 0.200" to 0.320" per revolution. In this manner, each insert may produce chips of 0.003" to 0.005" thickness and approximately 0.200" to 0.320" length fed axially backward through its individual gullet to the clearance space outside the bar.

For the typical rough bore cylinder bar of the illustrated embodiment, a 6.500" length 21 from a gage line over insert No. 1 and 6.220" length 22 over insert No. 8 with a maximum depth 23 of 5.250" are provided.

Other numbers of inserts and specific radial and axial increment dimensions may of course be adapted to various boring enlargement requirements for high volume production of many different parts. Optionally, positive rake inserts may be used for certain steels, aluminum and other nonferrous materials.

I claim:

1. Boring bar comprising body shaft, eight integral circumferentially spaced insert pockets projecting radially beyond the radius of said shaft, axially extending chip clearance gullets between each of said pockets, each of said pockets having an insert seating face for establishing its effective radial cutting position in progressive increments from minimum to maximum in circumferential succession following the direction of rotation, each pocket having an insert end seating wall for establishing its axial cutting position in progressive backward increments from axial first to last in said circumferential succession, and each pocket having an inset side seating wall for establishing its circumferential cutting position in equal circumferential progression, eight identical indexable cemented carbide cutting inserts, each insert having a negative radial rake being mounted in a respective pocket whereby the radial increments of said inserts are in the order of 0.003" to 0.005" and the axial increments of said insets are in the order of 0.025" to 0.040".

2. Boring bar of claim 1 sized to rough bore internal combustion engine cylinder.

3. Boring bar of claim 1 adapted to operate in a range of 300 to 400 R.P.M.

4. Boring bar of claim 3 adapted for an axial feed rate in a range of 0.200" to 0.320" per revolution.

* * * * *